(12) United States Patent
Grziwok et al.

(10) Patent No.: US 9,599,276 B2
(45) Date of Patent: Mar. 21, 2017

(54) SWIVEL MOUNT

(71) Applicant: Lilitab LLC, San Rafael, CA (US)

(72) Inventors: Bryan Rudolf Grziwok, Berkeley, CA (US); Adam Scott Aronson, San Rafael, CA (US)

(73) Assignee: Lilitab LLC, San Rafael, CA (US)

( * ) Notice: Subject to any disclaimer, the term of this patent is extended or adjusted under 35 U.S.C. 154(b) by 0 days.

(21) Appl. No.: 14/211,099

(22) Filed: Mar. 14, 2014

(65) Prior Publication Data

US 2014/0263884 A1 Sep. 18, 2014

Related U.S. Application Data

(60) Provisional application No. 61/787,829, filed on Mar. 15, 2013.

(51) Int. Cl.
*F16M 11/06* (2006.01)
*F16M 11/08* (2006.01)
*F16M 11/20* (2006.01)

(52) U.S. Cl.
CPC ............ *F16M 11/06* (2013.01); *F16M 11/08* (2013.01); *F16M 11/2014* (2013.01); *F16M 2200/021* (2013.01); *F16M 2200/022* (2013.01)

(58) Field of Classification Search
CPC .... F16M 11/06; F16M 11/08; F16M 11/2014; F16M 2200/022; F16M 2200/021
USPC ....... 248/131, 415, 418, 425, 917, 919, 920, 248/186.1, 186.2; 403/46
See application file for complete search history.

(56) References Cited

U.S. PATENT DOCUMENTS

| 2,932,481 | A | * | 4/1960 | Breer et al. | 248/354.6 |
| 3,065,662 | A | * | 11/1962 | Spoehr et al. | 411/399 |
| 4,449,170 | A | * | 5/1984 | Warshawsky | 362/413 |
| 4,687,167 | A | * | 8/1987 | Skalka et al. | 248/126 |
| 4,874,991 | A | * | 10/1989 | Ruskin | 315/362 |
| 4,880,193 | A | * | 11/1989 | Warshawsky | 248/122.1 |
| 6,379,073 | B1 | | 4/2002 | Yoo | |
| 7,218,510 | B2 | | 5/2007 | Hillman | |
| 7,316,377 | B2 | | 1/2008 | Smed | |
| 7,460,361 | B2 | * | 12/2008 | Yiu | 361/679.27 |
| 7,568,666 | B2 | * | 8/2009 | Kennedy | 248/121 |
| 7,694,922 | B2 | | 4/2010 | Kim | |
| 2004/0178314 | A1 | * | 9/2004 | Chen et al. | 248/349.1 |
| 2007/0001084 | A1 | * | 1/2007 | Jung et al. | 248/676 |

(Continued)

OTHER PUBLICATIONS http://armodilo.com/products/armotwist, Armodilo ArmoTwist, 2013, downloaded Sep. 25, 2013, 3 pages.

(Continued)

*Primary Examiner* — Eret McNichols
(74) *Attorney, Agent, or Firm* — Fish & Richardson P.C.

(57) ABSTRACT

Some examples of a mounting post to support a housing of electronic equipment include a swivel base having a first end and a second end. The first end is configured to mount to a surface about which the mounting post swivels. The mounting post includes A swivel post having a third end and a fourth end. The third end is configured to support the housing of the electronic equipment. A lower sleeve is attached to the second end and an upper sleeve is attached to the fourth end. The upper sleeve is attached to the lower sleeve at a distance to create a moment arm to react to transverse forces applied to the mounting post.

16 Claims, 3 Drawing Sheets

(56) References Cited

U.S. PATENT DOCUMENTS

| | | |
|---|---|---|
| 2007/0215762 A1* | 9/2007 | Lee et al. .................. 248/125.7 |
| 2007/0221798 A1* | 9/2007 | Lin ........................... 248/176.1 |
| 2008/0042020 A1* | 2/2008 | Laitila et al. ................ 248/131 |
| 2008/0100997 A1* | 5/2008 | Chen ............................ 361/681 |
| 2008/0116328 A1* | 5/2008 | Wang et al. ............... 248/122.1 |
| 2012/0061542 A1 | 3/2012 | Bostater |
| 2012/0193488 A1* | 8/2012 | Chung et al. ................ 248/201 |
| 2013/0161464 A1* | 6/2013 | Lin et al. .................. 248/278.1 |

OTHER PUBLICATIONS http://www.ipadenclosures.com/ipad_kiosk_enclosure/ipad_table_mounts_stands/axis-ipad-table-mount, iPad Enclosures LLC, Axis iPad Mount, 2013, downloaded Sep. 25, 2013, 4 pages.

\* cited by examiner

SWIVEL MOUNT

CROSS REFERENCE TO RELATED APPLICATIONS

This disclosure claims the benefit of the priority of U.S. Provisional Application Ser. No. 61/787,829, filed Mar. 15, 2013, and entitled "Swivel Mount", which is incorporated herein by reference in its entirety.

TECHNICAL FIELD

This disclosure relates to a swivel mount, for example, for mounting and swiveling electronic devices, such as computer tablets.

BACKGROUND

Certain computer devices, such as tablet computers, are wireless, light-weight, and often easily portable. Such devices can be used in commercial environments in which multiple users can view content presented on the computer devices. To view the content, in some situations, each of the multiple users may physically handle the device. Doing so can increase a risk of damage to the device, and, in some cases, theft of the device. In such cases, the device can be fixed to a certain location that the multiple users can access. In some situations, fixing the device in a static position can limit the ease with which the multiple users can access the device, for example, to view the content or otherwise interact with the device. A computer device, display or, as is the case with tablet computers, the entire computer, can be supported on a stand for easy viewing and interaction. This is particularly true when the device is intended for use in a public setting, and is supported by a post, or other mounting provision, at a convenient height for user interaction. In such cases, it can be advantageous to allow the display to rotate about a vertical (normal to the floor) axis so that it may be viewed and interacted with by multiple persons.

SUMMARY

This disclosure relates to a swivel mount on which electronic devices, for example, computers (such as tablet computers) can be mounted. The disclosed swivel mount allows rotational freedom about a vertical (normal to the floor) axis, limits said rotation, and allows said rotation to be adjusted and locked.

This disclosure further describes a specific series of elements which allow for the adjustability of the stiffness (looseness/firmness) of rotation, the ability to lock the position of the mount, and the ability to select a specific range of rotation.

An important element of the described apparatus is that all elements of the swivel mount are housed within the envelope of the swivel post. This is beneficial for cosmetics and prevents the risk of anything snagging on projections from the post as it rotates.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to a swivel mount, which, in some implementations, can be used with electronic devices, generally, and tablet computers in specific. In some implementations, the swivel mount described here can be implemented with a tablet computer or a display device of any computer system in an environment in which the tablet computer or the display device is fixed at a central location and is viewed from multiple locations that surround the central location. Such an environment can include, for example, a retail area or an eating area of a restaurant, in which multiple people can share the use of a single display terminal. For example, a display device displaying a menu of available food items can be affixed to the swivel mount. The swivel mount can be disposed at a table at which multiple diners are seated at different locations. The swivel mount can enable the multiple viewers to view the display device from their respective locations at the table. Another example environment in which the swivel mount can be disposed is at a checkout in a store such that a cashier and a customer can view the tablet computer affixed to the swivel mount from either side of a cash register. In this manner, the swivel mount can provide a facility for rotating the display back and forth between multiple users. In some implementations, the swivel mount can be rotated about an axis normal to the table or other work surface, as described below.

Implementations of the subject matter described in this disclosure can provide one or more of the following potential advantages. Using the swivel mount, a display device or a computer system (such as a tablet computer) can be enclosed in a housing that can be rotated about an axis (for example, a vertical or horizontal axis) that is normal to a surface. The rotational feature of the swivel mount can allow the display device or the computer system to be viewed and interacted with by multiple persons. A range of the rotation of the computer system or the display device can be controlled by implementing the techniques described here. In addition, a position of the computer system or the display device can be adjusted and locked. Also, a stiffness of the adjustability of the rotation, for example, a looseness or a firmness with which the swivel mount can be rotated, can be controlled. Moreover, substantially all components of the swivel mount are enclosed within a swivel post described below. In other words, the swivel post and the swivel mount are substantially free of any unnecessary protrusions. In an environment in which the swivel mount is disposed, for example, a commercial environment such as a cosmetics store, the risk of any item snagging on such protrusions can be decreased or eliminated.

Figure 1:
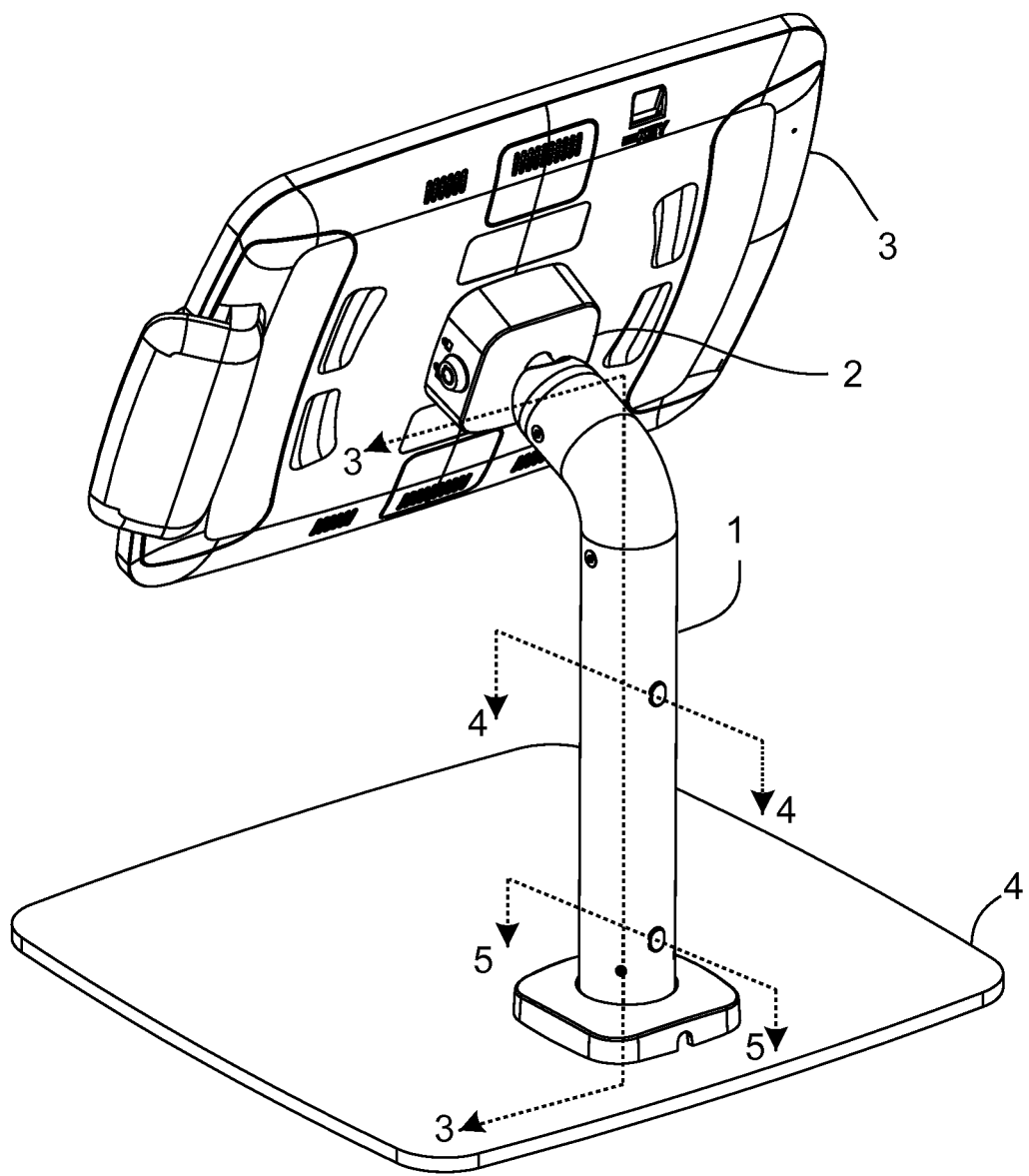
FIG. 1 illustrates an example swivel mount and supported enclosure for electronic devices.

FIG. 1 illustrates an example swivel mount 1 used to support a secure enclosure in which a device such as an electronic device (e.g. tablet computer, display, control panel) is disposed. A secure enclosure can be an enclosure which is designed so as to prevent access by unauthorized persons. Such a design can provide for the security of the contents of the enclosure, which can include, for example, a tablet computer or other equipment. The secure enclosure can be physically robust and tough to resist physical abuse. The secure enclosure need not include any accessible fasteners or other mechanism for opening the enclosure without significantly (and sometimes permanently) damaging the enclosure. The enclosure can include a housing, which can be a physical part (i.e., component) of the enclosure. A housing near a front of the enclosure is a front housing and one near a rear of the enclosure is a rear housing. When the secure enclosure is disposed, for example, in an environment in which one or more persons can interact with the enclosure or with the contents of the enclosure (or both), the enclosure can be a kiosk or a kiosk system.

In some implementations, the swivel mount 1 may attach directly to the back of the device (by fasteners, adhesive, or other methods). Alternatively, the swivel mount 1 may attach to an enclosure 3 in which the device is disposed. A neck portion 2 may be alternatively disposed between the swivel mount 1 and the enclosure 3 or device. Such neck portion 2 may provide additional functionality, such as allowing the enclosure 3 to be removably locked to the mount and pivoting. The base of the swivel mount 1 may attach directly to a counter, table, or other mounting surface, or may attach to a movable baseplate 4. The swivel mount 1 is designed to rotate about its centerline axis, perpendicular to the baseplate 4.

Figure 2:
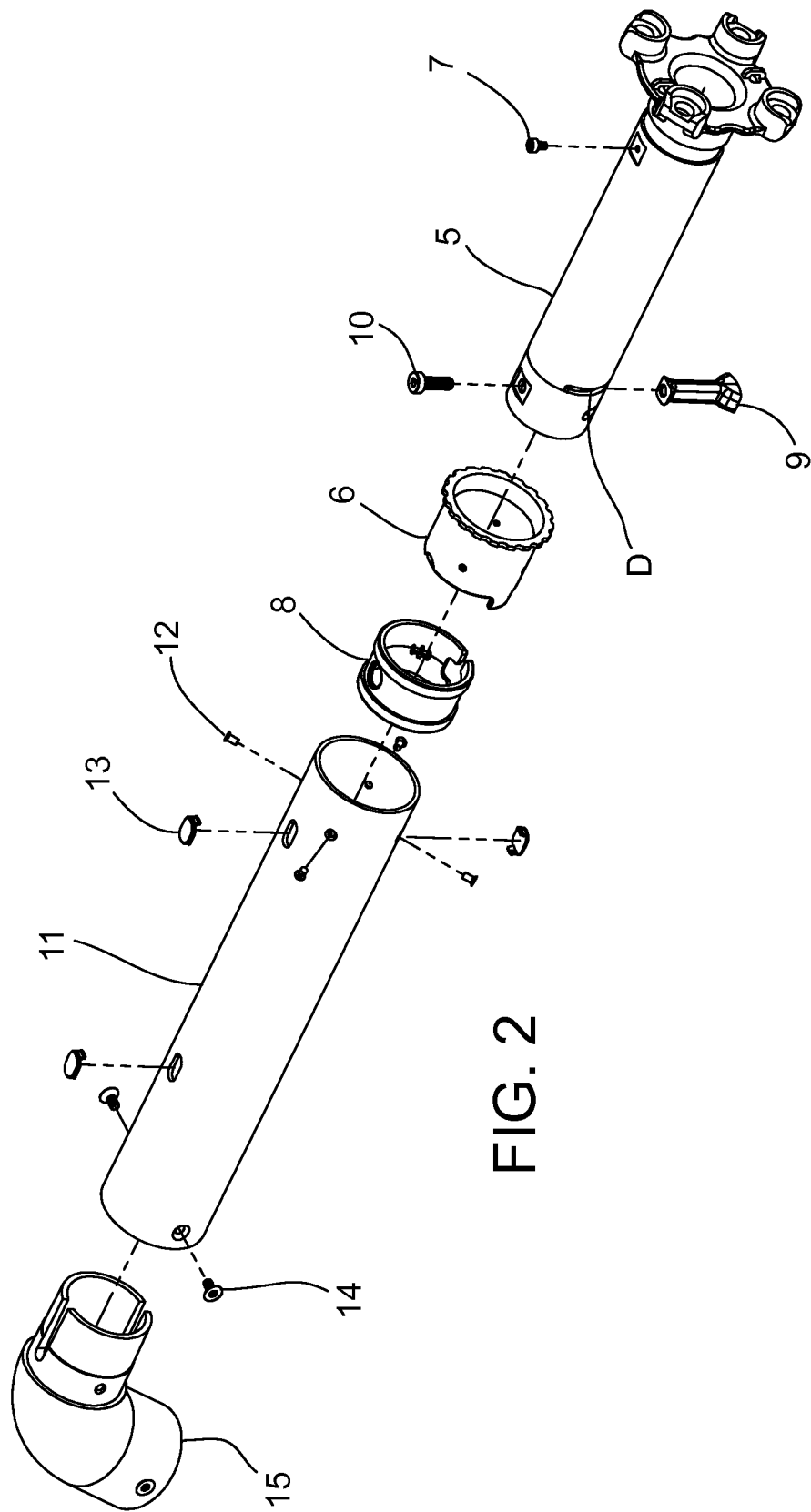
FIG. 2 shows an exploded view of the assembly to identify its various components.

FIG. 2 illustrates an exploded view of the swivel mount 1 to identify its component parts. To assemble the swivel mount, the lower sleeve 6 is placed onto the swivel base 5 and secured with the swivel range set screw 7. The upper sleeve 8 is then snapped into position on the swivel base 5. The spreader 9 is placed into its slot in the swivel base 5 and secured with the spreader screw 10. The swivel post 11 is then lowered into place and secured to the lower sleeve 6 with 4 screws 12. Screw openings are covered with plugs 13. A bend fitting 15 may be optionally mounted to the post using screws 14. A cut at the top of the swivel base 5 creates a relieved portion (D) which functions with the spreader 9 and spreader screw 10 to tighten and lock the swivel post 11 relative to the swivel base 5.

Figure 3:
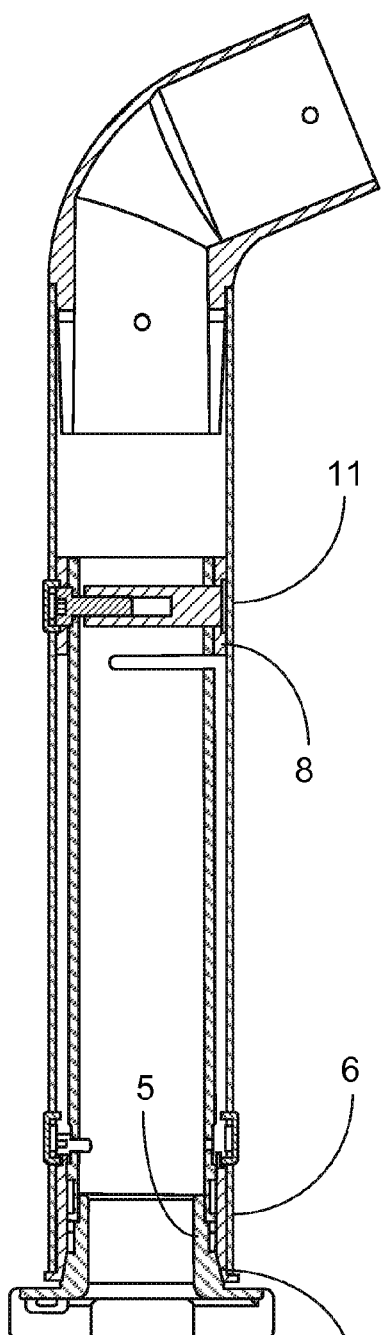
FIG. 3 shows a cross-section of the swivel mount.

FIG. 3 illustrates a cross-section of the swivel mount 1. The lower sleeve 6 and upper sleeve 8 are lubricated and/or made of lubricious material, such as acetal copolymer, brass, or bronze. They are mounted apart from each other in the system by a distance of approximately 4 internal diameters. In some implementations, the swivel post 11 has an ID of 35 mm, and the separation between upper sleeve 8 and lower sleeve 6 is approximately 140 mm. This distance creates a moment arm to react transverse forces, providing mechanical strength to the system. The lower sleeve 6 rides on a sloped surface A that is part of the swivel base 5. The shallow taper of surface A centers the post 11 over the swivel base 5 and creates a zero-clearance axis of rotation, held in place by the weight of the unit. The upper sleeve can also be adjusted to provide a smooth rotation by tightening the spreader screw 10 (described in FIG. 4.) The use of lubricious material (such as acetal copolymer) for the upper sleeve 8 and lower sleeve 6 is generally sufficient to provide smooth movement of the post 11. If desired, lubrication (such as lithium grease) may additionally be used at such interfaces where surfaces which slide over each other.

Figure 4:
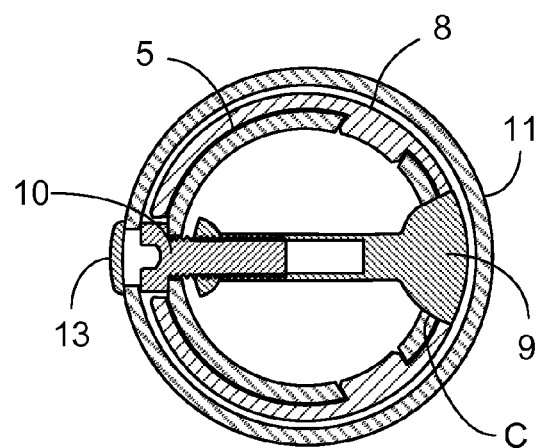
FIG. 4 shows a transverse cross-section of the mount including locking features.

FIG. 4 illustrates a cross-section of the spreader arrangement. The spreader 9 inserts into a relieved section at the top of the swivel base 5 and is held in place by the spreader screw. The relieved portion (FIG. 2, item D) is created by a transverse cut in the swivel base 5. The spreader 9 lies directly within the upper sleeve 8. Tightening the spreader screw 10 draws the spreader 9 into the spreader base 5 at interface C, splitting the relieved portion (FIG. 2, item D) and forcing the upper sleeve 8 against the inside wall of the swivel post 11. This action allows any looseness (slop) in the swivel joint to be removed. Such looseness may be caused by tolerance of assembly components, such as the ID of the swivel post 11, OD of the swivel base 5, and thickness of the upper sleeve 8. The amount by which the spreader screw 10 is tightened can control the stiffness (i.e., the looseness/firmness) with which the swivel mount 1 can rotate. Further tightening of the spreader screw 10 adds progressively more friction to the rotation of the swivel mount 1, as may be desired by the user, ultimately locking the swivel base 5 and swivel post 11 together and removing any swivel motion entirely. This process is reversible. Loosening the spreader screw 10 reduces the friction in the interface between the upper sleeve 8 and the swivel post 11, allowing the swivel post 11 to turn more freely about the swivel base 5. When not in use, the spreader screw 10 can be covered with a plug 13.

Figure 5:
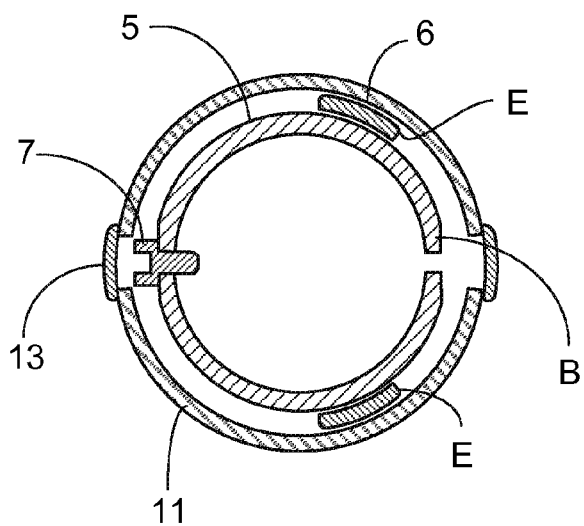
FIG. 5 shows a transverse cross-section of the mount including a mechanism for setting the range of rotation angle.

FIG. 5 illustrates a cross-section of the swivel range selection arrangement. The swivel range set screw 7 is screwed into the swivel base 5. The lower sleeve 6 includes two protrusions E. The lower sleeve 6 is securely attached to the swivel post 11 with screws 12. The protrusions E are set apart in such a way that the swivel post 11 is free to rotate coaxially about the swivel base 5 until the side of the protrusions E contact the swivel range set screw 7. FIG. 5 shows the swivel range set screw 7 in a position that allows for +/−90 degrees (180 total degrees) of rotation. At the user's option, the swivel range set screw 7 may be moved to position B, where a more limited range of +/−45 degrees (90 total degrees) of rotation would be allowed. Various versions of the lower sleeve 6 can be made which allow any desired range of rotation. Plugs 13 may be used to cover access to the swivel range set screw 7 when not in use.

Certain aspects of the subject matter described here can be implemented as an arrangement of upper and lower sleeves, disposed on a swivel base, and contained within a swivel post for the purpose of supporting and allowing the swivel post to move smoothly around the swivel base on their shared center axis. Certain aspects of the subject matter described here can be implemented as a spreader arrangement for the purpose of adjusting the stiffness (tightness/looseness) of the rotation. Certain aspects of the subject matter described here can be implemented as a swivel range selection arrangement for the purpose of locking the rotation and/or for the purpose of setting the range of rotation. Certain aspects of the subject matter described here can be implemented as a swivel mount in which the components are disposed entirely within the swivel post. Certain aspects of the subject matter described here can be implemented to incorporate a swivel mount as described here to facilitate the sharing of an electronic device by multiple users and/or as part of a secure kiosk arrangement.

A number of implementations have been described. Nevertheless, it will be understood that various modifications can be made without departing from the spirit and scope of the various inventions described herein.

What is claimed is:

1. A mounting post to support a housing for electronic equipment, the mounting post comprising:
    a swivel base configured to mount to a surface about which the mounting post swivels;

a swivel post configured to support the housing of the electronic equipment;

a lower sleeve attached to the swivel post; and an upper sleeve attached to the swivel base, the upper sleeve positioned above the lower sleeve with reference to the swivel base, the upper sleeve positioned relative to the lower sleeve at a distance to create a moment arm to react to transverse forces applied to the mounting post.

2. The mounting post of claim 1, wherein the swivel base comprises a sloped surface, and wherein the lower sleeve rides on the sloped surface of the swivel base.

3. The mounting post of claim 2, wherein the sloped surface comprises a shallow taper configured to center the swivel post over the swivel base to create a zero-clearance axis of rotation.

4. The mounting post of claim 1, wherein each of the lower sleeve and the upper sleeve are made of lubricious material.

5. The mounting post of claim 1, further comprising a spreader mechanism coupled to the swivel base, the spreader mechanism to adjust a stiffness of rotation of the mounting post or to lock rotation of the mounting post.

6. The mounting post of claim 5, wherein the spreader mechanism comprises:

a spreader configured to be inserted into a relieved section in the swivel base; and a spreader screw to hold the spreader in place in the relieved section.

7. The mounting post of claim 6, wherein the spreader lies directly within the upper sleeve such that tightening the spreader screw draws the spreader into a spreader base at an interface to split the relieved section and to force the upper sleeve against an inside wall of the swivel post.

8. The mounting post of claim 6, further comprising a removable plug to cover the spreader screw.

9. The mounting post of claim 1, further comprising:

a swivel range set screw screwed into the swivel base; and a plurality of protrusions included in the lower sleeve, the plurality of protrusions set apart in the lower sleeve such that the swivel post is coaxially rotatable about the swivel base until a side of each protrusion contacts the swivel range set screw.

10. The mounting post of claim 1, wherein features of the mounting post are disposed within the swivel post.

11. The mounting post of claim 1, wherein the lower sleeve contacts the swivel base.

12. The mounting post of claim 1, wherein the swivel base is configured to be rotationally fixed, and wherein the swivel post is configured to rotate relative to the swivel base.

13. The mounting post of claim 12, wherein the lower sleeve is configured to rotate relative to the swivel base.

14. The mounting post of claim 1, further comprising a neck portion configured to be attached to the swivel post at a first end opposite a second end to which the lower sleeve is attached, wherein the housing of the electronic equipment is configured to mount to the neck portion.

15. A mounting post to support a housing for electronic equipment, the mounting post comprising:

a swivel base configured to mount to a surface about which the mounting post swivels, wherein the swivel base comprises a sloped surface;

a swivel post configured to support the housing of the electronic equipment;

a lower sleeve attached to the swivel post, wherein the lower sleeve rides on the sloped surface of the swivel base wherein the sloped surface comprises a shallow taper configured to center the swivel post over the swivel base to create a zero-clearance axis of rotation; and an upper sleeve attached to the swivel base, the upper sleeve positioned relative to the lower sleeve at a distance to create a moment arm to react to transverse forces applied to the mounting post.

16. A mounting post to support a housing for electronic equipment, the mounting post comprising:

a swivel base configured to mount to a surface about which the mounting post swivels;

a swivel post configured to support the housing of the electronic equipment;

a lower sleeve attached to the swivel post;

an upper sleeve attached to the swivel base, the upper sleeve positioned relative to the lower sleeve at a distance to create a moment arm to react to transverse forces applied to the mounting post; and a spreader mechanism coupled to the swivel base, the spreader mechanism to adjust a stiffness of rotation of the mounting post or to lock rotation of the mounting post, wherein the spreader mechanism comprises:

a spreader configured to be inserted into a relieved section in the swivel base; and a spreader screw to hold the spreader in place in the relieved section.

\* \* \* \* \*